US005640741A

United States Patent [19]

Yano

[11] Patent Number: 5,640,741

[45] Date of Patent: Jun. 24, 1997

[54] STRUCTURE FOR HANDLE OF POWER TOOL

[75] Inventor: Susumu Yano, Fuchu, Japan

[73] Assignee: Ryobi Limited, Tokyo, Japan

[21] Appl. No.: 539,674

[22] Filed: Oct. 5, 1995

[30] Foreign Application Priority Data

Oct. 13, 1994 [JP] Japan .................................... 6-247593

[51] Int. Cl.[6] ............................ A47J 45/10; A47B 95/02

[52] U.S. Cl. ................ 16/114 R; 16/111 R; 16/DIG. 12; 408/241 R

[58] Field of Search ........................... 16/110 R, 111 RR, 16/114 R, DIG. 12, DIG. 18, DIG. 19; 173/162.2, 169; 408/241 R, 124; 30/312

[56] References Cited

U.S. PATENT DOCUMENTS

| | | | |
|---|---|---|---|
| 4,087,141 | 5/1978 | Roberts | 16/110 R |
| 4,645,235 | 2/1987 | Joseph | 16/DIG. 12 |
| 5,353,474 | 10/1994 | Good | 16/111 R |
| 5,445,479 | 8/1995 | Hillinger | 408/241 R |
| 5,469,601 | 11/1995 | Jackson | 16/114 R |
| 5,522,466 | 6/1996 | Harada et al. | 173/162.2 |

FOREIGN PATENT DOCUMENTS

| | | | |
|---|---|---|---|
| 2239833 | 7/1991 | WIPO | 16/110 R |

*Primary Examiner*—M. Rachuba
*Assistant Examiner*—Donald M. Gurley
*Attorney, Agent, or Firm*—Brooks & Kushman P.C.

[57] ABSTRACT

A handle structure of a power tool comprises a handle portion continuously formed with the main body of the power tool and a gutter-like soft grip for covering the handle portion, the soft grip having two first engaging projections on its inner surface and two second engaging pieces provided on each edge of the soft grip, the handle portion having two first receiving recesses provided on an arched receiving surface for receiving the soft grip to detachably engage the two first engaging projections and the second receiving grooves provided between the receiving surface and an outer front side surface of the handle portion for detachably receiving the second engaging pieces, the first engaging recesses and the second engaging grooves being completely separated from a space provided in the front portion of the handle portion for accommodating wires and the like.

5 Claims, 5 Drawing Sheets

STRUCTURE FOR HANDLE OF POWER TOOL

BACKGROUND OF THE INVENTION

This invention relates to a structure for a handle of a power tool.

In general, a power tool has a soft grip on its handle portion to increase capacity of resistance against vibration and to give a soft feeling to an operator when he grips the handle portion. Such a power tool is disclosed in EP 0502363 A1. FIG. 7 shows the handle portion 103 of the power tool disclosed in EP 0502363 A1. The power tool has a main body 101 of a housing and the handle portion 103 is formed integrally with the main body 101. The handle portion 103 has a longitudinal receiving surface 101*a* which extends from the rear end of the main body 101 to the lower end of the handle portion 103 to receive a soft grip 102 having a shape of saddle shown in FIG. 8. Along the edge of the surface 101*a* are provided a plurality of apertures 101*b*, 101*b* . . . 101*b* to receive the engaging pieces 102*a*, 102*a* . . . 102*a* provided at the edge of the soft grip 102.

When the soft grip 102 is assembled with the handle portion 103, the engaging pieces 102*a* are inserted into the apertures 101*b* of the surface 101*a*, respectively. However, in general, the handle portion 103 accommodates a battery and wires, etc., therein. Therefore, the operator may get an electric shock when an electric current flows along the inner surfaces of the apertures 101*b* and the engaging pieces 102*a* are damaged to cause the wires to protrude outwardly from the apertures 101*b*. In addition, dust or water may get into the handle portion through the apertures 101*b*.

SUMMARY OF THE INVENTION

It is an object to provide a structure for a handle of a power tool which is electrically safe for an operator and which can reliably prevent dust or water from getting into the handle portion of the power tool.

According to this invention, there is provided a structure for a handle used for a power tool, comprising a handle portion with which a main body of the power tool is provided and a soft grip which is attached to the handle portion, wherein said handle portion comprises: a space for accommodating electric wires and the like, which is provided at a front portion of the handle portion; a receiving surface for receiving detachably the soft grip, which is provided at a rear outer portion of the handle portion at least one first receiving recess for detachably receiving a first engaging projection provided on an inner surface of the soft grip; and at least one second receiving groove provided on each side surface of the handle portion for engaging a second engaging piece provided on each side of the soft grip in its widthwise direction, and said soft grip comprises: a hard shell in the form of gutter made from hard material, which has the first engaging projection at its inner surface and the second engaging piece on each side of the hard shell; and a soft shell for covering the hard shell to give a soft feeling to an operator when he grips the handle, the first engaging projection and the second receiving groove being separated from the space for accommodating wires and the like.

The second receiving groove may be formed at a step portion provided at a point portion between the receiving surface and the outer front side surface of the handle portion. The first receiving recess may hold a nut in an unrotatable manner to engage a fastening screw held in the first engaging projection. Further, the first engaging projection may have an elasticity so as to be inserted into the first receiving recess while being shrunken or deformed by a hand of an operator.

DETAILED DESCRIPTION OF THE INVENTION

Embodiments of this invention will now be explained with reference to the attached drawings.

Figure 1:
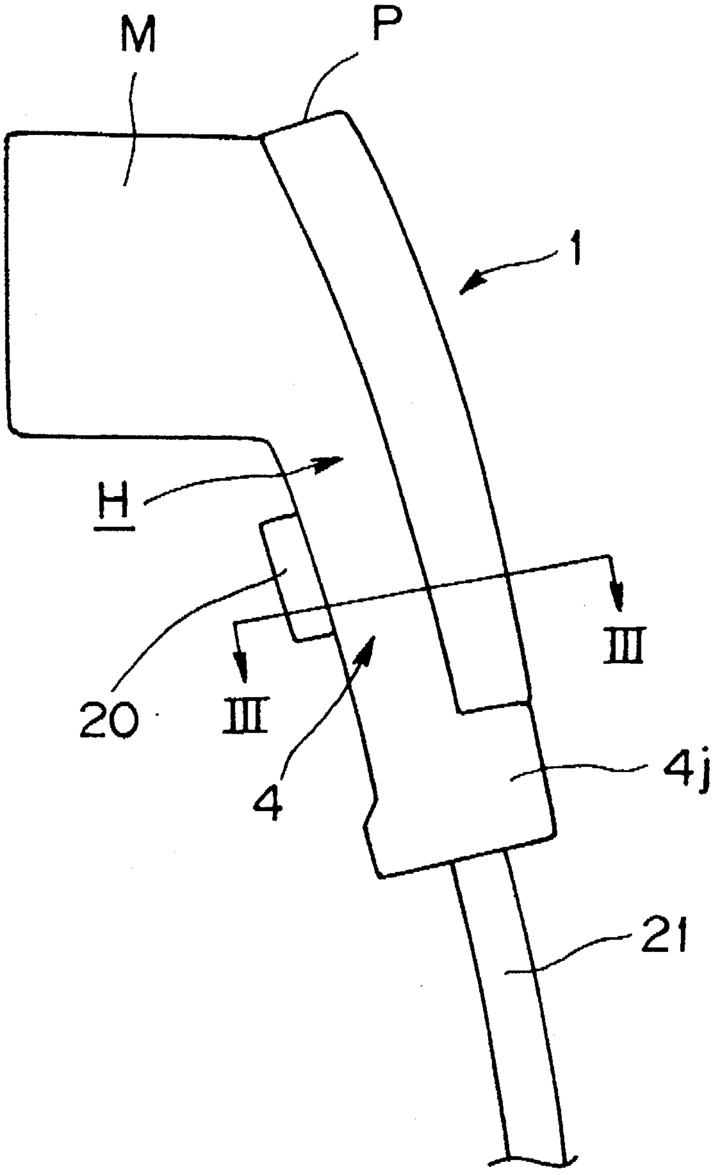
FIG. 1 shows a partial side view of a power tool according to this invention.
Figure 2:
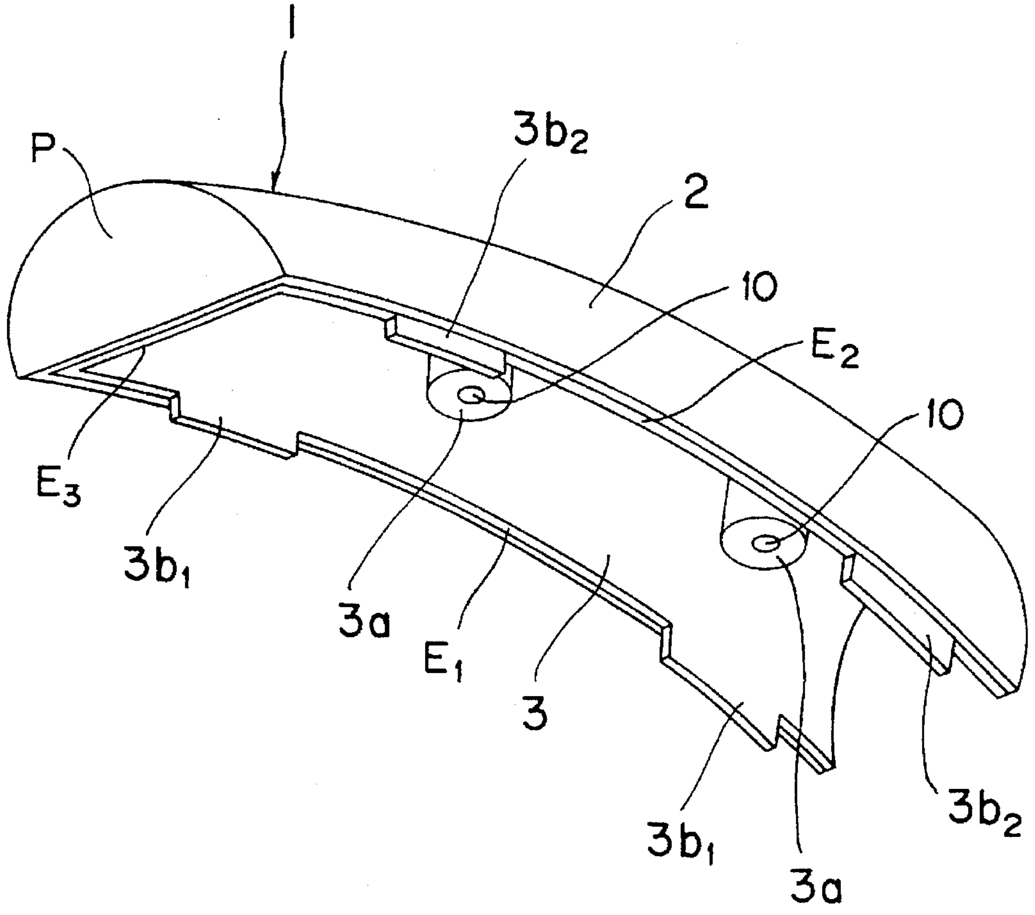
FIG. 2 shows a perspective view of a soft grip used for a structure of a handle according to this invention.

In FIGS. 1 and 2, a power tool has a main body M of a housing and a handle H provided at the rear portion of the main body M. The handle comprises a handle portion 4 formed integrally with the rear portion of the main body M. At the rear side of the handle H (right side in FIG. 1) is provided a soft grip 1 (gripping member) which extends from the upper top of the rear end of the main body M to the bottom 4*j* of the handle portion 4. A cord 21 is connected to the bottom of the handle H, and a switch 20 is provided on the front side of the handle H. The soft grip 1 has a gutter-like shape, as shown in FIG. 2, with a closed end at one end thereof and an open end at the other end thereof. The closed end of the soft grip 1 is set at the upper end of the rear portion of the main body M, and the open end thereof is set near the bottom of the handle as shown in FIG. 1. The soft grip 1 comprises a soft shell 2 made from soft plastic to give a soft feeling to an operator when he grips the handle H and a hard shell 3 also in the shape of gutter made from hard plastic, which is covered with the soft shell 2 having an end plate P. The hard shell 3 has two first engaging projections 3*a* and 3*a* which are formed at a predetermined interval at the center portion of the inner surface thereof in its widthwise direction. The hard shell 3 has two longitudinal edges $E_1$ and $E_2$ and one widthwise edge $E_3$, of an end plate P, and the longitudinal edges $E_1$ and $E_2$ have two second engaging pieces $3b_1$, $3b_1$; and $3b_2$, $3b_2$, respectively, each of which is provided near the end of each longitudinal edge. Each of the first engaging projections 3*a* has a screw hole 10 through which a screw 7 (FIG. 3) is passed.

Figure 3:
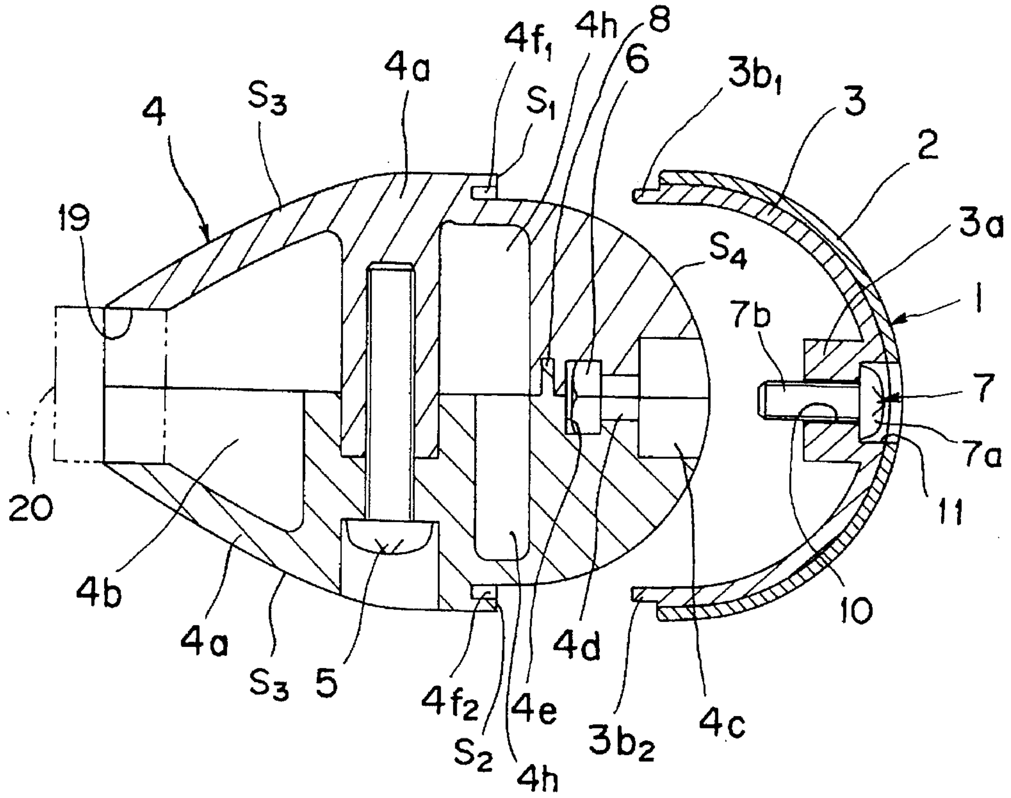
FIG. 3 shows an exploded sectional view of a structure of the handle, taken along the line III—III in FIG. 1, according to this invention.

FIG. 3 shows an exploded sectional view of a handle structure of this invention. The handle portion generally has a pear shape in section. The handle portion 4 comprises two half members 4*a* and 4*b* which are integrally fixed by a plurality of screws 5 to be assembled with each other. The handle portion 4 is provided, at its front portion which the fingers of a hand of an operator contact, with a space 4*b* for accommodating electric wires and the like (not shown). The handle portion 4 also has lightening holes 4*h* and 4*h* to decrease the weight of the handle H. At the rear portion of the handle portion 4 which the palm of a hand of an operator contacts are provided two first receiving recesses 4*c* and 4*c* for receiving the first engaging projections 3*a* of the soft grip 1, respectively. On the inner side of each first receiving recess 4*c* is formed a nut accommodating space 4*e* which is communicated with the receiving recess 4*c* through a connecting path 4*d*. The nut accommodating space 4*e* has a shape such as a hexagonal shape for accommodating a nut 6 in a state where the nut is not rotated. The receiving recess 4*c*, the connecting path 4*d* and the nut accommodating space 4*e* are not communicated with the space 4*b* for accommodating electric wires. That is, the recess 4*c*, the path 4*d* and the space 4*e* are completely separated from the space 4*b* by a wall or material from which the half members are made. One half member 4*a* has, at its side face, a step portion $S_1$ at which a second receiving groove 4*$f_1$* for receiving the second engaging piece 3*$b_1$* is provided in the front and rear direction of the handle H, and the other half member 4*b* has, at its side face, a step portion $S_2$ at which a second receiving groove 4*$f_2$* for receiving the engaging piece 3*$b_2$* is provided in the front and rear direction of the handle H. The receiving grooves 4*$f_1$* and 4*$f_2$* are not communicated from the space 4*b*. Each of the step portions $S_1$ and $S_2$ is provided between the outer front side surface $S_3$ of the handle portion 4 and a receiving surface $S_4$ in the shape of semi-circle in section for receiving the soft grip 1. The outer front side surface $S_3$ is located at the front half portion of the handle portion 4 and the receiving surface $S_4$ is located at the rear half portion thereof. At the front end portion of the handle portion 4 is provided an opening 19 for accommodating the switch 20. The two half members 4*a* and 4*b* are opposed to each other and their joining face has an engaging projection 8. Each first engaging projection 3*a* has the hole 10 through which the fastening screw 7 is passed. The screw 7 comprises a screw head 7*a* which is accommodated in a recess 11 formed in the soft and hard shells 2 and 3 in a state where the head 7*a* is not projected outwardly and a male screw portion 7*b* engaged with a female screw of the hole 10.

Figure 4:
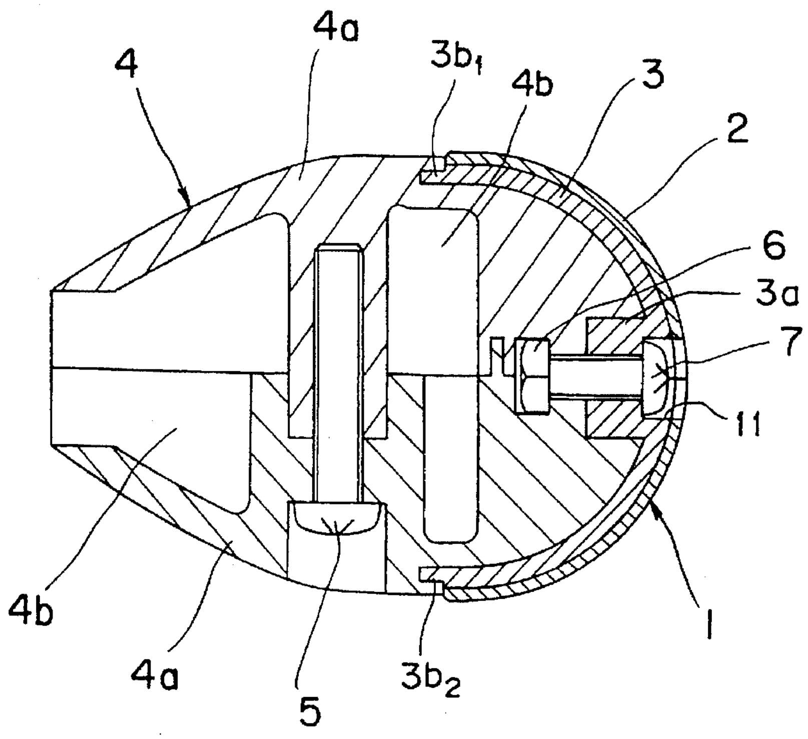
FIG. 4 shows an assembled sectional view of the structure of the handle according to this invention.

When the soft grip 1 is assembled with the handle portion 4, two fastening screws 7 and 7 are set in the engaging projections, respectively, and the two half members 4*a* and 4*b* are joined with each other with the nut 6 accommodated in the space 4*e*. The soft grip 1 is then attached to the outer arched receiving surface $S_4$ of the handle portion 4 in such a manner that the first engaging projections 3*a* and 3*a* are inserted into the first receiving recesses 4*c* and 4*c*, respectively, and the engaging pieces 3*$b_1$* and 3*$b_2$* are inserted into the receiving grooves 4*$f_1$* and 4*$f_2$*, respectively (FIG. 3). With this state, each screw 7 is meshed with the nut 6 to be fastened. Thus, the soft grip 1 can be completely fixed to the handle potion 4 (FIG. 4). At this time, since the space 4*b* for electric wires, etc., is completely separated from the receiving recesses 4*c*, the connecting paths 4*d*, the nut accommodating spaces 4*e* and the second receiving grooves 4*$f_1$* and 4*$f_2$*, the electric wires do not reach the nut accommodating spaces 4*e* and the grooves 4*$f_1$* and 4*$f_2$*. Therefore, an electric current never flows in the fastening screw 7 and the soft grip 1 to prevent the operator from being struck by electricity. Dusts or soils or the like do not enter the handle portion 4 from the receiving recesses 4*c*, the connecting paths 4*d*, the nut accommodating spaces 4*e* and the grooves 4*$f_1$* and 4*$f_2$*.

Figure 5:
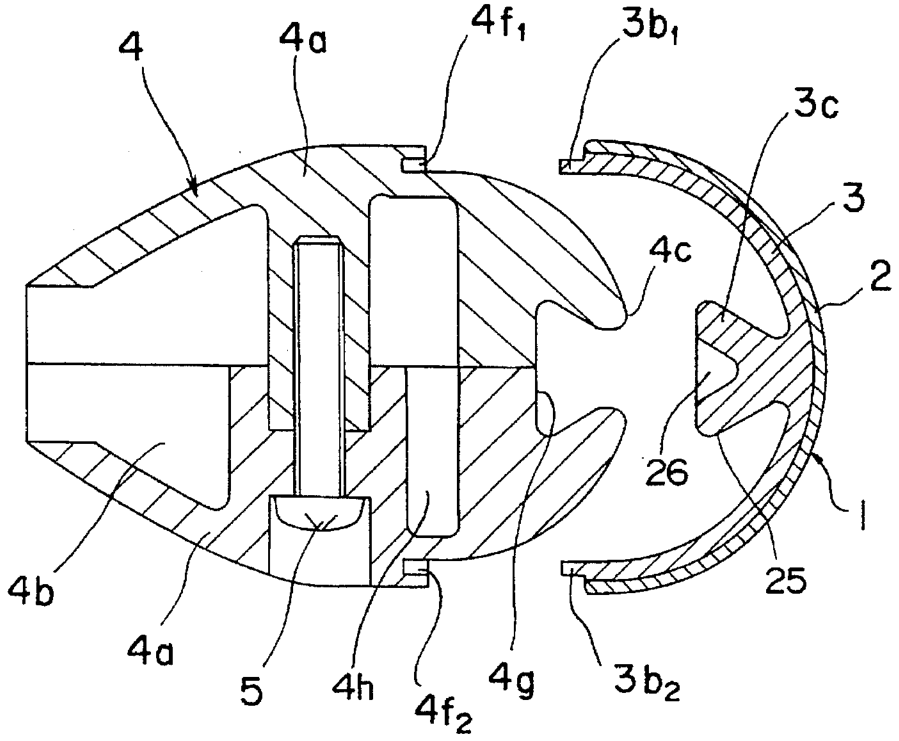
FIG. 5 shows an exploded sectional view of a structure for a handle of another embodiment, taken along the line III—III in FIG. 1, according to this invention.
Figure 6:
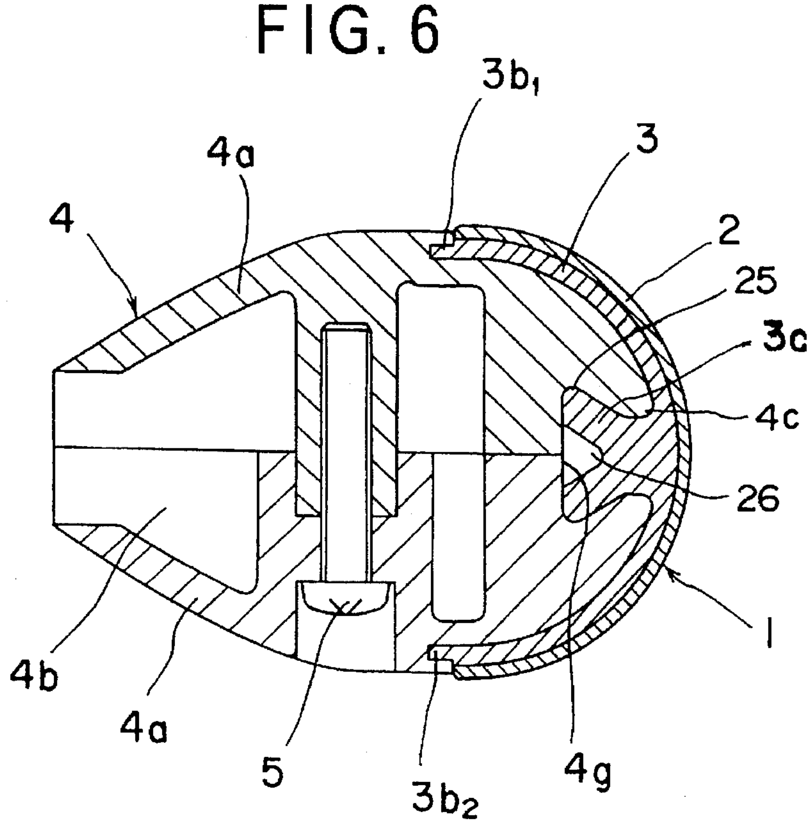
FIG. 6 shows an assembled sectional view of the structure for the handle of another embodiment according to this invention.
Figure 7:
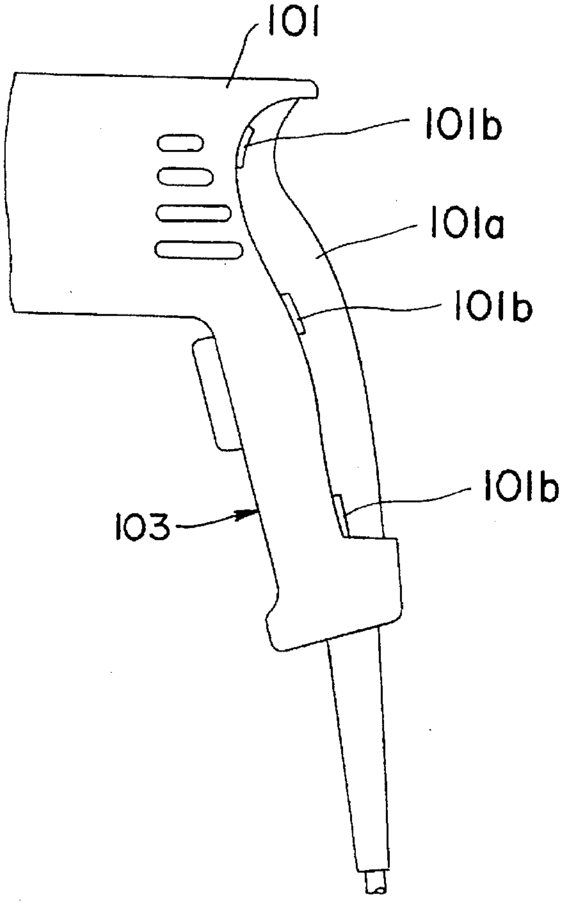
FIG. 7 shows a side view of a conventional handle portion of a power tool.
Figure 8:
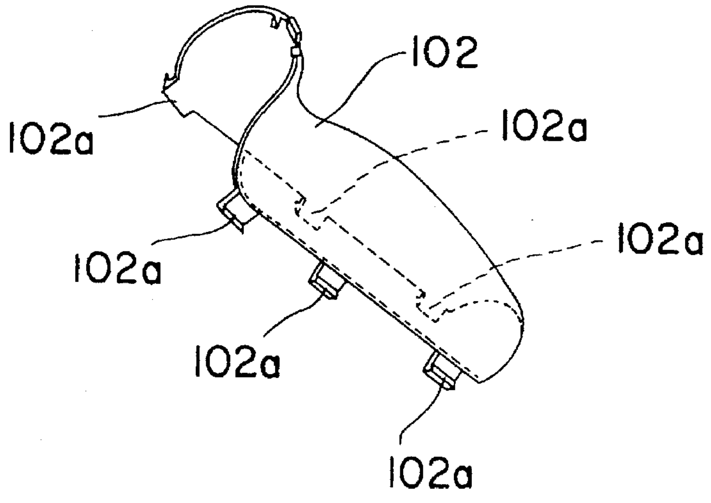
FIG. 8 shows a perspective view of a soft grip attached to the conventional handle portion.

Next, another embodiment will now be explained with reference to FIGS. 5 and 6.

The same members as the above embodiment are indicated by the same numbers or marks as those shown in the above embodiment, and detailed descriptions with respect to the same members are omitted.

In this embodiment, two first engaging projections 3*c* and 3*c* having a dove tail shape in section are provided at the hard shell 3 instead of the first engaging projections 3*a* and 3*a*. Each first engaging projection has a conical shape, and the circumferential edge portion of its expanded bottom has a round shape in section. A recess 26 is formed on the bottom surface of the projection 3*c* to be shrunken in its radial direction. Therefore, each first engaging projection 3*c* has a proper elasticity. Further, the handle portion 4 has two first receiving recesses 4*g* and 4*g* each having a dove tail shape in section for receiving the first engaging projection 3*c*. Each receiving recess 4*g* has, at its inlet, a round portion 4*c* for smoothly passing the round portion 25 of the first projection 3*c*. The receiving recesses 4*g* and 4*g* are not communicated with the space 4*b* for accommodating wires.

When the soft grip 1 is fixed to the handle portion 4, the operator crushes the expanded end of each dove tail projection 3*c* having an elasticity to insert it into the receiving recess 4*g*. Thus, the soft grip 1 can be fixed simply and speedily to the handle portion 4 (FIG. 5). At this time, since the space 4*b* for accommodating wires is separated from the receiving recesses 4*g* and the grooves 4*$f_1$* and 4*$f_2$*, water or dust does not enter the interior of the handle portion 4.

According to this invention, the space 4*b* for accommodating electric wires and the like can be completely shielded or separated from the exterior of the handle H, and, therefore, the operator is never struck by electricity to perform a working operation safely. The above structure for the handle can effectively prevent dust or water from entering the interior of the handle H.

What is claimed is:

1. In a structure for a handle used for a power tool, which comprises a handle portion with which a main body of the power tool is provided and a soft grip which is attached to the handle portion, wherein said handle portion comprises:

a) a space for accommodating electric wires, which is provided at a front portion of the handle portion;

b) a receiving surface for receiving detachably the soft grip, which is provided at a rear outer portion of the handle portion;

c) at least one first receiving recess for detachably receiving a first engaging projection provided on an inner surface of the soft grip; and d) at least one second receiving groove provided on each side surface of the handle portion for engaging a second engaging piece provided on each side of the soft grip in its widthwise direction, and said soft grip comprises:

a) a hard shell in the form of gutter having a concave inner surface and an outer surface, made from hard material, which has a first engaging projection at its inner surface and a second engaging piece on each side of the hard shell; and b) a soft shell covering the outer surface of the hard shell to give a soft feeling to an operator when he grips the handle, said first engaging projection and the second receiving groove being separated from the space for accommodating wires.

2. A structure according to claim 1, wherein a step portion is provided between an outer front side surface of the handle portion and the receiving surface to which the soft grip is detachably attached, the second receiving groove being formed at the step portion for receiving the second engaging piece which is provided at an edge of the hard shell of the soft grip.

3. A structure according to claim 1, wherein the first engaging projection holds a fastening screw, a nut accommodating space being formed continuously with the first receiving recess through a connecting path to accommodate a nut therein in an unrotatable manner, the fastening screw being detachably meshed with the nut in the nut accommodating space, the handle portion, comprising two half members which are detachably assembled with each other.

4. A structure according to claim 3, wherein the hard shell has at least one recess in its outer surface for accommodating a head of the fastening screw to prevent the head of the fastening screw from projecting outwardly.

5. A structure according to claim 1, the first engaging projection has an expanded form with an elasticity and the first receiving recess has an expanded form corresponding to the first engaging projection to receive it.

* * * * *